United States Patent
Jacobs

[11] Patent Number: 6,000,417
[45] Date of Patent: Dec. 14, 1999

[54] BI-DIRECTIONAL MAGNETICALLY-OPERATED CHECK VALVE FOR HIGH-PURITY APPLICATIONS

[76] Inventor: Richard R. Jacobs, 509 W. Harvard St., Orlando, Fla. 32804

[21] Appl. No.: 09/001,098

[22] Filed: Dec. 30, 1997

Related U.S. Application Data

[60] Provisional application No. 60/034,647, Jan. 2, 1997.
[51] Int. Cl.⁶ ............ F16K 15/02; F16K 31/02; F16K 31/08
[52] U.S. Cl. ............ 137/2; 137/239; 137/528; 137/270; 251/65; 251/129.01; 251/129.02; 251/129.21
[58] Field of Search ............ 251/65, 129.01, 251/129.02, 129.21; 137/516.29, 528, 493, 2, 15, 239, 315, 269.5, 270, 271

[56] References Cited

U.S. PATENT DOCUMENTS

| | | | |
|---|---|---|---|
| 2,646,071 | 7/1953 | Wagner | 251/65 |
| 2,667,895 | 2/1954 | Pool et al. | 251/65 |
| 2,949,931 | 8/1960 | Ruppright | 251/65 |
| 3,212,751 | 10/1965 | Hassa | 251/65 |
| 3,348,543 | 10/1967 | Stafford | 251/65 |
| 3,409,038 | 11/1968 | Blackford | 251/65 |
| 3,467,135 | 9/1969 | Muskalla | 251/65 |
| 3,893,651 | 7/1975 | Uecker | 251/65 |
| 4,349,042 | 9/1982 | Shimizu | 251/65 |
| 4,481,389 | 11/1984 | Johnson | 251/65 |
| 4,489,754 | 12/1984 | Sessle et al. | 137/528 |
| 4,750,705 | 6/1988 | Zippe | 251/65 |
| 5,320,136 | 6/1994 | Morris et al. | 251/65 |
| 5,450,877 | 9/1995 | Graffin | 251/65 |
| 5,623,957 | 4/1997 | Lekholm | 251/65 |

Primary Examiner—George L. Walton
Attorney, Agent, or Firm—Gerald E. Linden

[57] ABSTRACT

A check valve is described which employs a magnetic biasing component, disposed external to the valve body, to exert force on a poppet, at least a portion of which is ferrous. In a "normal" mode of operation, the poppet is urged against the inlet end surface of the cavity by the basing component, and moves away from the inlet end surface of the cavity to permit fluid flow from an inlet port to an outlet (downstream) port once a differential cracking pressure is achieved. In a "bidirectional" or "purge" mode of operation, the biasing component is positioned adjacent the outlet end of the valve body to retain the poppet in an open position, away from the inlet end surface of the cavity. The bi-directional capability of the disclosed check valve is beneficial for welded installation and cyclic purging of systems, and allows for a full vacuum to be achieved because the effect of cracking pressure is eliminated. The external location of the biasing component eliminates the biasing component from the fluid flow, thereby avoiding contamination by particulates. Alternatively, the external biasing component can be ferrous, and the poppet magnetic. Biasing means can be disposed on both the upstream and downstream sides of the valve body.

14 Claims, 10 Drawing Sheets

Figure 1

Figure 1C
"PURGE" MODE

MAINTAINED OPEN
(BI-DIRECTIONAL FLOW)

Figure 1A
"NORMAL" MODE
BELOW CRACKING PRESSURE

Figure 1B
"NORMAL" MODE
CRACKING PRESSURE EXCEEDED

Figure 2A
"NORMAL" MODE

Figure 2B
"NORMAL" MODE

BI-DIRECTIONAL MAGNETICALLY-OPERATED CHECK VALVE FOR HIGH-PURITY APPLICATIONS

CROSS-REFERENCE TO RELATED APPLICATIONS

This is a continuation-in-part of commonly-owned, copending U.S. Provisional Patent Application No. 60/034,647 filed Jan. 2, 1997.

TECHNICAL FIELD OF THE INVENTION

The invention relates to techniques for controlling fluid (gases, liquids) flow and, more particularly, to valves for controlling the flow of gases—namely, check valves.

BACKGROUND OF THE INVENTION

A valve which permits gases (or fluids) to flow in one direction, and which automatically (without outside intervention) prevents gases from flowing in an opposite direction is commonly referred to as a "check valve", or a "one-way check valve". A typical check valve comprises a typically cylindrical valve body (chamber, housing) disposed between an inlet port and an outlet port. The inlet port communicates with an inlet orifice in the valve body, and may be integral with same. The outlet port communicates with an outlet orifice in the valve body, and may be integral with same. A movable member disposed within the valve body, such as a poppet (e.g., a disc), is biased (seated), typically by a spring which is also disposed within the valve body, against the inlet orifice so as to block gas from passing from the outlet orifice to the inlet orifice. When gas entering the inlet port exceeds a threshold predetermined "cracking" pressure (more accurately, a threshold positive pressure differential pressure between the inlet port and the outlet port), the movable member is urged by the differential gas pressure away from the inlet orifice, thereby permitting the gas to flow through the valve body, into the outlet orifice, and out of the outlet port. When the situation is reversed, and there is more pressure at the outlet port than at the inlet port, the movable member remains seated (in some instances, more securely) against the inlet orifice, preventing gas flow through the valve body. A resilient sealing member, such as an O-ring may also be used to ensure a gas-tight seal between the movable member and the inlet orifice.

The following references discuss check valves, generally:

U.S. Pat. No. 2,608,376 ("'376") discloses a construction of a check valve wherein a cylindrical member (e.g., 27) is moveable in a chamber (e.g., 26) and is normally biased by a coil spring (e.g., 37) to seal against a shoulder between a larger portion of the bore (e.g., 23; in the terms of the present patent application, the "valve body" or "housing") and a smaller portion thereof (in the terms of the present patent application, the "inlet orifice").

The coil spring of the '376 patent is disposed within the valve body, and is therefore (i) subjected to the fluids (e.g., gases) flowing through the check valve and (ii) inaccessible for adjusting the threshold opening force (also known as "cracking pressure").

It bears mention here that any internal moving part of a check valve has the potential to, and often does, add particulate matter to the fluid flow. This is particularly true in the case of springs which shed particles, albeit microscopic particles, as they flex back and forth. Such contaminants are undesirable in high-purity applications such as semiconductor manufacture. Another problem inherent in check valve design is elastomer sealing members which can be "wetted" by the fluid flow, making it difficult to completely purge the system of residual fluids (contaminants). Evidently, the larger the surface area of the elastomer sealing member exposed to fluid flow, the more wetting (residual surface contamination) will occur.

Another problem inherent with conventional check valves is that there is no facile means for eliminating the biasing force to allow for bi-directional flow. This problem is addressed by and solved by the present invention.

It is known to use magnets, either alone or in combination with the aforementioned springs, as biasing components to exert a closing force on the poppet (moving member) of a one-way check valve. The following references disclose the use of magnets:

U.S. Pat. No. 2,646,071 ("'071") discloses a magnetic check valve which includes a valve disc (e.g., 35; in the terms of the present patent application, a "poppet") and a magnet (e.g., 26) disposed within the chamber (28; in the terms of the present patent application, the "inlet orifice"). In one disclosed embodiment, the valve disc (40) is non-magnetic, and includes a magnetic member (42) which is disposed so as not to align with the valve seat (25). As aptly noted in this patent, when employing a valve disc which possesses magnetic properties, it is important to avoid the problem of ferrous metal particles being attracted to the disc in a location which would prevent a tight closure between said disc (poppet) and said valve seat (inlet orifice).

The magnet(s) of the '071 patent are disposed within the valve body, and are therefore (i) subjected to the fluids (e.g., gases) flowing through the check valve and (ii) inaccessible for adjusting (or eliminating) the threshold opening force.

U.S. Pat. No. 2,667,895 ("'895") discloses a magnetically biased check valve wherein the poppet (valve 20) is a cylindrically-shaped magnet which is free to move within the valve body, toward and away from the valve seat (18). The valve body components (housing 10 and bonnet 12) are of a non-magnetic material (brass). A second cylindrical magnet 26 is fixed immovably within the valve body in orientation wherein it will exert a closing force on the magnet-poppet.

The magnet(s) of the '895 patent are disposed within the valve body, and are therefore (i) subjected to the fluids (e.g., gases) flowing through the check valve and (ii) inaccessible for adjusting the threshold opening force.

U.S. Pat. No. 2,949,931 ("'931") discloses a magnetic check valve having an annular tubular permanent magnet 21 disposed within the valve body. In this example, the poppet is a disc 28 which is made from any suitable permeable material such as iron and the like, and the poppet 28 is biased against the inlet orifice by the magnet 21.

None of the above-referenced check valves are "bi-directional", capable of flowing fluids in two opposite directions.

In certain fluid-flow applications, such as the high-purity applications associated with semiconductor manufacturing, it is often necessary to evacuate a system (e.g., a piping system) which has been filled with hazardous (e.g., toxic, caustic) gases via a check valve. In order to evacuate the system, a vacuum pump is connected to the downstream side of the check valve. When pulling a vacuum, the pressure differential decreases until it is less than the cracking pressure. Once this occurs, it is inherent that the poppet shuts and isolates the upstream side, prior to achieving the vacuum maintained on the downstream side. This results in there being residual fluids within the system on the upstream side of the check valve.

Additional references of interest are: U.S. Pat. No. 3,217,736, U.S. Pat. No. 3,076,417, U.S. Pat. No. 4,275,759, U.S. Pat. No. 4,489,754, U.S. Pat. No. 5,320,136 and German Patent No. 212,570.

BRIEF DESCRIPTION (SUMMARY) OF THE INVENTION

It is therefore an object of the invention to provide an improved check valve.

It is another object of the invention to provide a check-valve that can operate "bi-directionally"—namely, which can be caused to permit the free flow of fluid in two opposite directions.

It is another object of the invention to provide a check valve which is capable of pulling a complete vacuum, and which readily permits a system to which the check valve is connected to be completely purged of fluids (e.g., gases), irrespective of the cracking force required to maintain the poppet of the check valve in an open position.

According to the invention, a check valve has a valve body and a poppet disposed in a cavity of the valve body. The poppet is formed, at least partially, of a ferrous material. A magnetic component is disposed external to the valve body to exert an attractive force on the poppet.

In a "normal" mode of operation, the magnetic component is disposed adjacent the inlet end (upstream side) of the check valve body, thereby seating the poppet against an interior surface of the valve body. In this "normal" mode of operation, flow through the check valve is restricted to one direction only, from the inlet end (upstream side) of the check valve to the outlet end (downstream side) of the check valve, once a cracking pressure has been achieved to unseat the poppet.

In a "purge" mode of operation, the magnetic component is disposed adjacent the outlet end (downstream side) of the check valve body, thereby unseating the poppet. In this "purge" mode of operation, flow through the check valve is unrestricted, and may proceed in either of two directions: (a) from the inlet end (upstream side) of the check valve to the outlet end (downstream side) of the check valve, and (b) from the outlet end (downstream side) of the check valve to the inlet end (upstream side) of the check valve. This flow in the "opposite" direction is important in applications wherein it is important to completely purge (of fluid) a system in which the check valve is connected. Since cracking pressure is eliminated in this mode of operation, a vacuum source connected to the downstream side of the check valve can successfully purge every last bit (e.g., atom) of fluid from a system connected on either the upstream or downstream sides of the check valve.

The springless design of the check valve eliminates the possibility of a spring contributing particles to the fluid flow, thereby making the springless check valve of the present invention well-suited to high purity applications, such as semiconductor fabrication, other electronic applications, pharmaceutical applications, food processing, and aerospace applications.

According to a feature of the invention, the poppet is provided with an elastomer o-ring which is "captured" by interference fit in an annular groove. This eliminates the need to use any adhesives (bonding material), and minimizes the amount of "wetted" area. Namely, conventional check valves often employ bonded elastomers covering the full face of the poppet.

The check valve of the present invention is designed to provide unidirectional flow for high-purity applications, and is also capable of allowing bi-directional flow. It offers a unique "springless" design by using a magnetic biasing component to seat the poppet. Since the biasing component is external to the valve body, it is isolated from the fluid flow and cannot contaminate the fluid. Conventional spring-seated poppets are particle contributors and allow for only unidirectional flow control.

When the magnetic biasing component is placed on the downstream (outlet) end of the valve body, bi-directional flow can be achieved. In this "purge" mode of operation, there is no cracking pressure involved, which allows for essentially full and free flow through the valve.

The present invention facilitates "welded installation". Welded installation of valves is a common industry practice for assembly of piping systems. Welding requires the elimination of gases that can react with and contaminate molten metal during the welding process. This can be achieved in one of two ways: The (a) pulling a vacuum on the downstream (outlet) side of the valve, or (b) pressurizing the upstream (inlet) side of the check valve (e.g., with an inert gas). Due to the force required to overcome the cracking pressure and unseat the poppet, this causes weld implosions or explosions (blowouts), respectively. Conventional check valves plague installers with high scrap rates due to such weld implosions and blow-outs. The bi-directional capability of the check valve of the present invention eliminates the need to supply pressure or vacuum during welding, thereby eliminating the source of these weld failures.

The present invention enables "downstream purging". Piping systems often contain hazardous gases. These gases require inert (non-hazardous) cycle-purging in order to perform routine maintenance or disassembly. Cycle purging is defined as the procedure which implements a pressurization sequence with a safe gas followed by a depressurization (vacuum) sequence. These cycles are typically repeated numerous times until all the hazardous gas is removed from the system. Conventional check valves are incapable of allowing the hazardous gas to be removed from all components that are downstream of the valve. Once hazardous gas flows past a conventional check valve, it must be removed from a downstream outlet, thereby requiring the addition of such a downstream outlet to the piping system if there is not already one in the system. When this is the case (i.e., no downstream outlet in the system), a much more difficult procedure must be employed to perform downstream purging, involving suiting operators in protective suits and providing them with self-contained breathing apparatus and gas monitoring equipment. The bi-directional capability of the present invention allows for cycle purging (eliminating hazardous gases) without requiring additional purge components (e.g., downstream outlets) downstream of the check valve.

The present invention allows for "full vacuum". The bi-directional check valve of the present invention permits a full vacuum to be "pulled" through the check valve. Creating a vacuum within a piping system is an industry requirement for the following two reasons:

it allows for adequate purging and removal of unwanted matter (e.g., contaminant or hazardous material; and it enables leak testing by pressure rise or inboard helium detection.

As is inherent in the operation of conventional check valves, when pulling a vacuum from the downstream side, the biasing spring (or magnet) seats the poppet before a full vacuum is achieved. This is due to the cracking pressure required. The poppet requires greater pressure on the inlet side than on the outlet side in order to open (unseat). When pulling a vacuum, the pressure differential decreases until it is less than the cracking pressure. Once this occurs, the poppet will re-seat, thereby sealing off the upstream side from the downstream side. This seating of the poppet thereby isolates the upstream side, prior to achieving the vacuum that is being maintained on the downstream side. The bi-directional capability of the check valve of the present invention allows the equal inlet and outlet side vacuum because, in the purge mode, it requires no cracking pressure (pressure differential).

The present invention reduces "particle generation". Since the biasing component of the check valve of the present invention is magnetic, rather than a spring, particle generation resulting from spring flexure is completely eliminated.

The poppet of the present invention utilizes an o-ring sealing member, presenting a minimal area for wetting, and consequent minimal adverse effects thereof.

Other objects, features and advantages of the invention will become apparent in light of the following description thereof.

BRIEF DESCRIPTION OF THE DRAWINGS

Reference will now be made in detail to preferred embodiments of the invention, examples of which are illustrated in the accompanying drawings. Although the invention will be described in the context of these preferred embodiments, it should be understood that it is not intended to limit the spirit and scope of the invention to these particular embodiments.

Generally, in the figures, elements formed of ferrous materials are shown either without cross-hatching or with cross-hatch lines of uniform thickness, and elements formed of non-ferrous materials are shown either without cross-hatching or with cross-hatch lines of alternating thicknesses.

DETAILED DESCRIPTION OF THE INVENTION

FIGS. 1, 1A, 1B, 1C, 1D, 1E and 1F illustrate an embodiment of the check valve 100 of the present invention. A principal component of the check valve 100 is the valve chamber (body) which has two mating parts (portions), an "upstream" body part 102 and a "downstream" body part 104.

Figure 1:
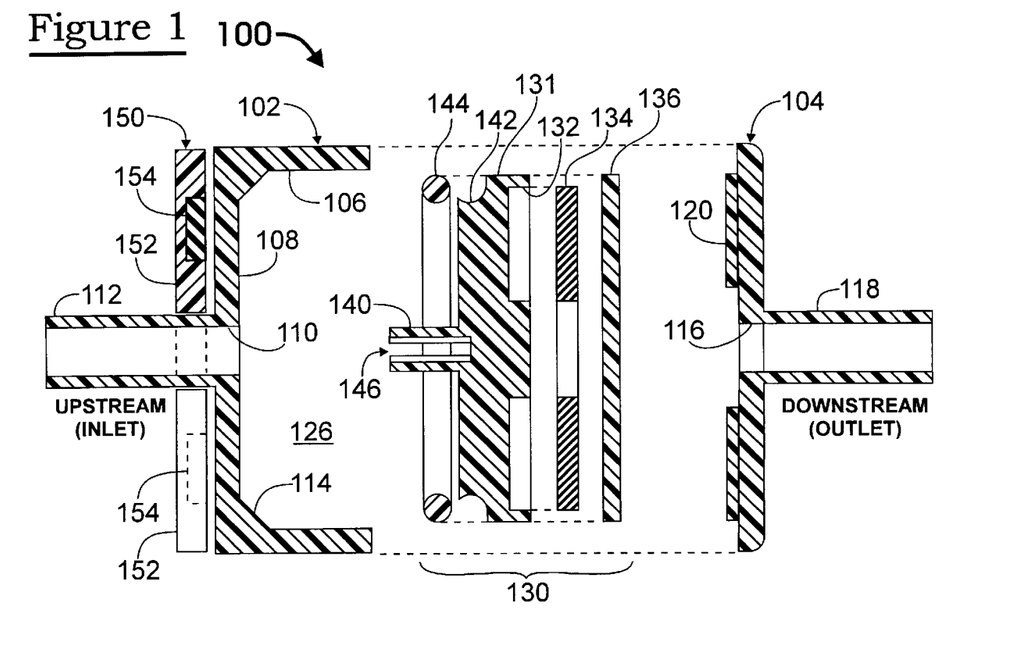
FIG. 1 is an exploded cross-sectional view of an embodiment of the check valve of the present invention.

The upstream body part 102 is in the form of an annulus, having a cylindrical portion 106 and a disc-like planar portion 108 extending across one end of the cylindrical portion 106 and contiguous therewith. The cylindrical portion 106 has an outer diameter and an inner diameter. The disc-like portion 108 has an outer diameter which corresponds to the outer diameter of the cylindrical portion 106, and is provided with a central hole 110 having a diameter extending therethrough coaxial with the cylindrical portion 106. A cylindrical inlet port 112 is contiguous with an outer surface of the disc-like portion 108, has an outer diameter which corresponds to the diameter of the central hole 110 and is coaxial therewith.

At the junction of the cylindrical portion 104 and the planar portion 108, the planar portion 108 of the body part 102 is chamfered, or angled, such at 45°. As will be evident from the discussion set forth hereinbelow, this chamfered portion 114 forms a seat for the o-ring (144) of the poppet (130) to seal against.

The various portions of the upstream body part 102 are preferably formed integrally with one another from a non-ferrous material, such by machining them from a single block of stainless steel. It is, however, within the scope of this invention that the inlet port 112 is formed separately from the remaining portions of the upstream body part 102, and assembled (such as with threads) thereto. It is also within the scope of this invention that the various body parts (including the downstream body part) of the valve body be made of plastic, or other non-metal material(s).

The downstream body part 104 is in the form of a disc, having an outer diameter corresponding to the outer diameter of the upstream body part 102, and is provided with a central hole 116 (compare 110) having a diameter extending therethrough coaxially therewith. A cylindrical outlet port 118 is contiguous with an outer surface of the downstream body part 104 and has an outer diameter which corresponds to the diameter of the central hole 116 and is coaxial therewith. An inner surface of the downstream body part 104 is provided with a ring-like projection 120 which has an outer diameter less than the inner diameter of the upstream body part 102 and an inner diameter greater than the diameter of the central hole 116 through the downstream body part 104.

Figure 1A:
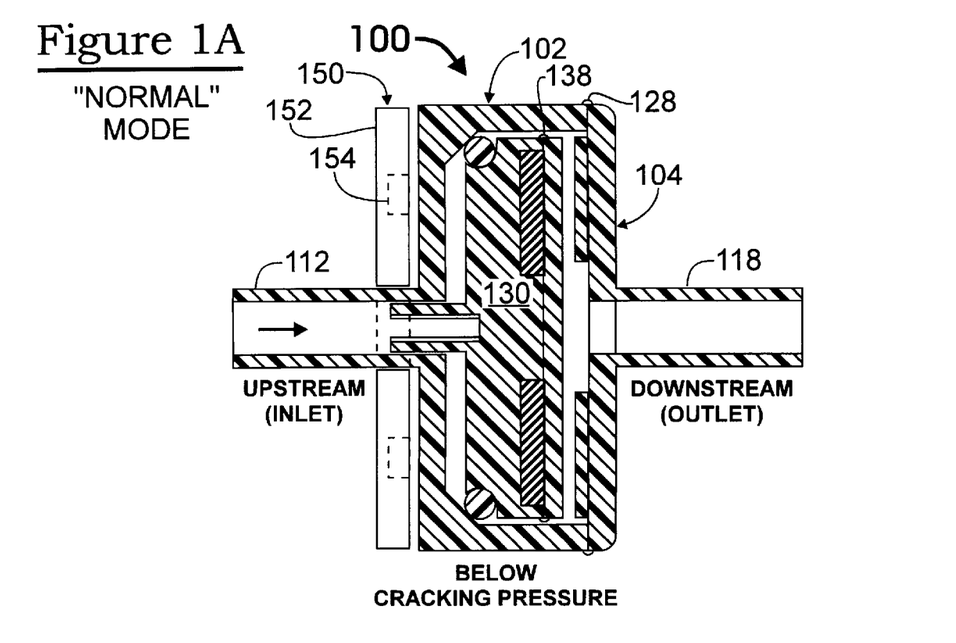
FIG. 1A is a cross-sectional view of the check valve of FIG. 1, fully assembled, in a "normal" mode of operation, showing the check valve closed (below cracking pressure), according to the invention.
Figure 1B:
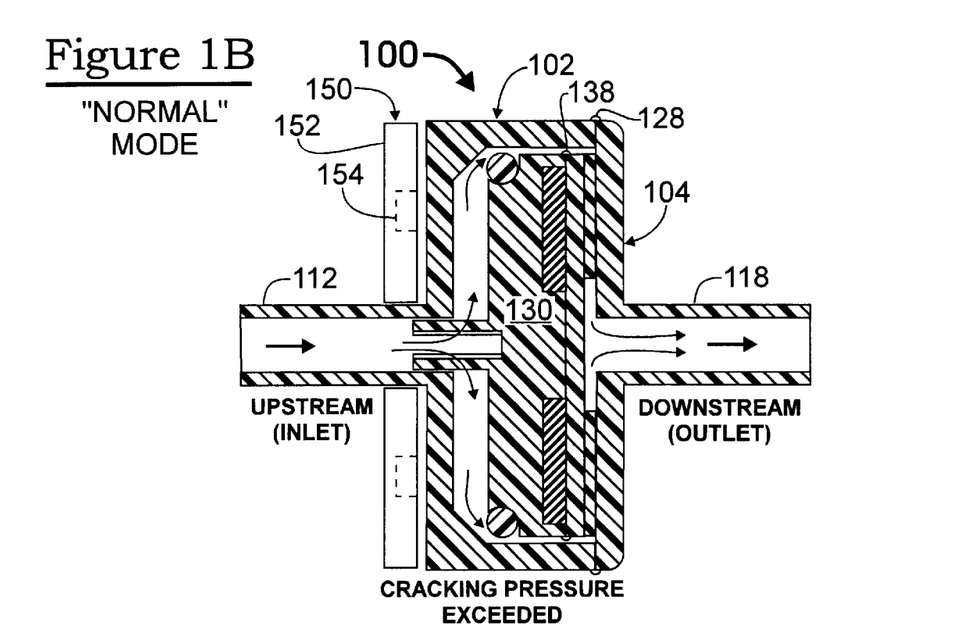
FIG. 1B is a cross-sectional view of the check valve of FIG. 1, fully assembled, in a "normal" mode of operation, showing the check valve open (cracking pressure exceeded), according to the invention.
Figure 1C:
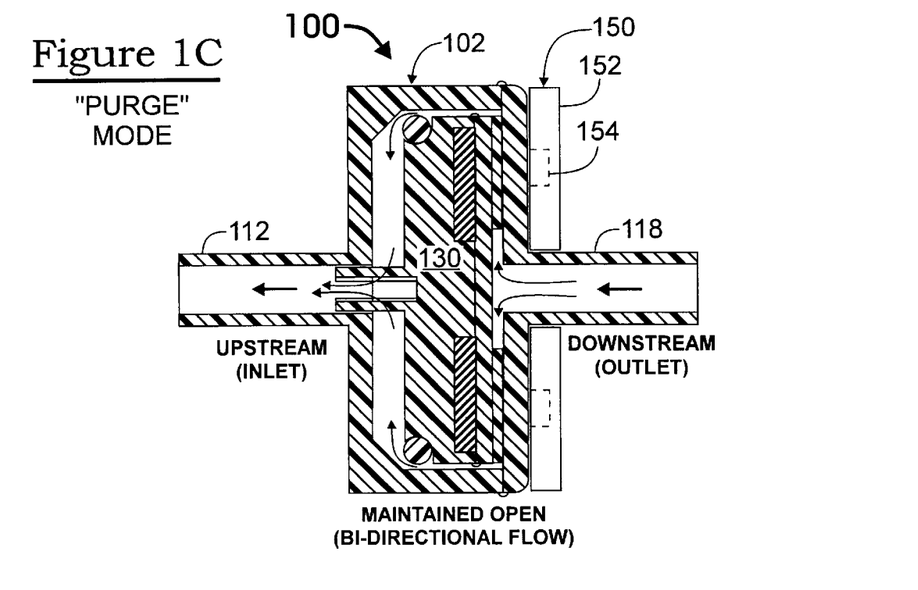
FIG. 1C is a cross-sectional view of the check valve of FIG. 1, fully assembled, in a "purge" mode of operation, according to the invention.
Figure 1D:
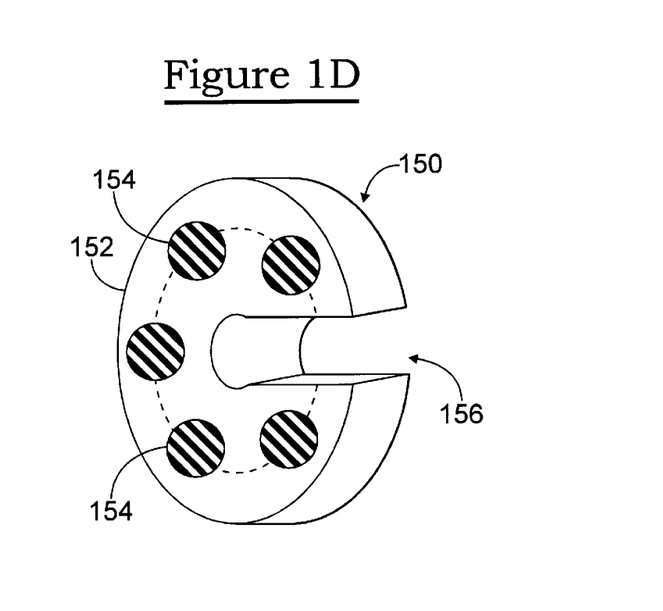
FIG. 1D is a perspective view of the biasing component of the check valve of FIG. 1, according to the invention.
Figure 1E:
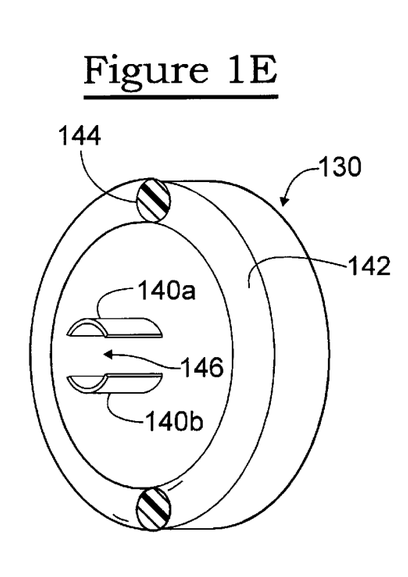
FIG. 1E is a perspective view of the poppet component of the check valve of FIG. 1, according to the invention.
Figure 1F:
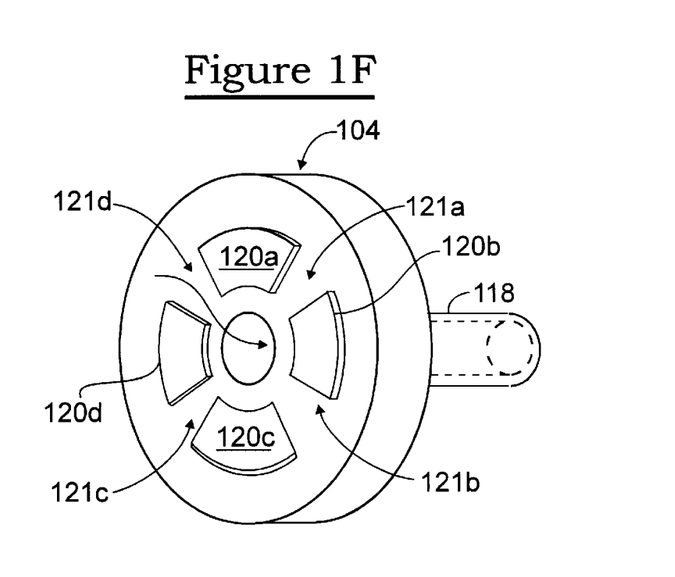
FIG. 1F is a perspective view of the downstream body portion of the check valve of FIG. 1, according to the invention.

As best viewed in FIG. 1F, the ring-like projection 120 is segmented, for example having four portions 120a . . . 120d with four channels 121a . . . 121d therebetween. As indicated by the arrows in the figure, fluid can flow through these channels between an outer periphery of the projection 120 to the outlet orifice 116.

The various portions of the downstream body part 104 are preferably formed integrally with one another from a non-ferrous material, such by machining them from a single block of stainless steel. It is, however, within the scope of this invention that the outlet port 118 is formed separately from the remaining portions of the upstream body part 104, and assembled (such as with threads) thereto. In FIGS. 1, 1A, 1B, and 1C, the projection 120 is shown as a separate component, but is preferably formed integrally with the remaining portions of the downstream body part 104.

When the upstream and downstream body parts 102 and 104 are mated with one another, a chamber 126 is formed by the inner surfaces of these two body parts 102 and 104. As best viewed in FIG. 1A, the body parts 102 and 104 are preferably welded (see weld bead 128) to one another to completely seal the chamber 128 from the atmosphere external to the valve body. It is within the scope of the invention that the upstream and downstream body parts are assembled other than by welding, such as by screwing them together with one another, although this would not be preferred in high-purity applications or applications involving hazardous fluids.

A poppet component (element) 130 is disposed within the chamber (cavity) 126 formed by the body parts 102 and 104. The poppet element 130 includes a disc-like portion 131 having an outer diameter which is slightly, such as 0.001–0.020 inches less than the inner diameter of the cylindrical portion 106 of the upstream body part 102 in order to (i) permit the poppet element to move freely (axially) within the cavity 126, and (ii) permit fluids to flow around the periphery of the disc-like portion 131 of the poppet element in the gap between the outer diameter of the disc-like portion 131 and the cylindrical portion 106. The disc-like portion 131 is provided with a ring-like recess 132 on a downstream surface thereof. The recess 132 has an outer diameter which is less than the outer diameter of the disc-like portion 131. A ring-like element 134 of ferrous material such as iron is sized and shaped to fit into the ring-like recess 132. A disc 136 of non-ferrous material and having a diameter corresponding to the outer diameter of the disc-like portion 131 is fitted to the downstream surface of the disc-like portion 131 to retain the ring-like element 134 within the ring-like recess 132 and, as best viewed in FIG. 1A is suitably welded (see weld bead 138) to the disc-like portion 131. The weld is shown as a bead 138 projecting from the periphery of the disc-like portion 131. However, it should be understood that the resulting (from welding) bead is preferably ground down to be flush with the periphery of the disc-like portion 131 so as not to cause the poppet component 130 to bind in the cavity and not to impair the flow of fluid around the poppet component 130.

An inner (upstream) surface of the poppet component 130 is provided with a central axial cylindrical projection 140 (guide pin) which serves to guide the poppet as it moves back-and-forth axially within the cavity 126. The outer diameter of the cylindrical projection is slightly, such as 0.0005–0.0015 inches less than the inner diameter of the inlet port 112, and (as assembled) is disposed therein, so as to permit the poppet component 130 to slide back and forth, guided by the guide pin 140. As best viewed in FIG. 1E, the guide pin 140 is suitably formed as two arcuate segments 140a and 140b of a cylinder, with a radial slot 146 separating the two arcuate segments. In use, fluid flows through the slot 146 between the inside and the outside of the guide pin 140.

The "biasing component" 150 is in the general form of a disc and has a body portion 152. The body portion 152 may be magnetic, or it may be non-magnetic (as shown) and provided with a plurality of small magnet elements 154 (as shown) so that when the biasing component is placed adjacent the upstream end of the valve 100, exterior the valve body (as shown in FIG. 1), the biasing component 150 attracts (biases) the poppet element against the planar portion 108 of the upstream part 102 of the check valve 100. Fluid passing through the inlet port 112 must first achieve a threshold "cracking" pressure to overcome the attractive force exerted by the biasing component 150 on the poppet 130. The number of magnets (154) and/or the strength of the individual magnets (154) is readily adjusted to tailor the attractive force exerted by the biasing component 150 upon the poppet 130.

As best viewed in FIG. 1D, to facilitate positioning the biasing component 150 on either the inlet port 112 (upstream end) of the check valve (as illustrated in FIG. 1A) or the outlet port 118 (downstream end) of the check valve (as illustrated in FIG. 1B), the biasing component 150 is preferably provided with a slot 156 extending from a peripheral surface thereof to the center of the body portion 150. The width of the slot (vertical dimension, as illustrated) is slightly larger than the outside diameter(s) of the inlet or outlet ports.

According to a feature of the invention, the biasing component 150 is removably affixed to the exterior of the valve body on the inlet end thereof and may be repositioned to be affixed to the outlet end thereof to permit bi-directional "free" (i.e., no cracking pressure required) flow through the check valve.

As illustrated in FIG. 1A, when operating the system in a "normal" mode, the biasing component 150 causes the poppet component 130 to be biased (seated) against the upstream end (inner surface) of the cavity 126 which will prevent fluid from flowing between the inlet port 112 and the outlet port 118 when the pressure differential is below the cracking pressure (i.e., the force exerted by the magnet 150 on the poppet 130). In this state, fluid cannot flow in either direction.

Once the cracking pressure is exceeded, the poppet 130 will move to a downstream position, as is illustrated in FIG. 1B. In this "normal" mode of operation, fluid travels from the upstream side of the check valve 100, through the inlet port 112, through the guide pin 140, past (around the periphery of) the poppet component 130, and out of the outlet port 118 to the downstream side of the check valve, as illustrated by the arrows in the figure.

Evidently, if the pressure at the outlet port 118 exceeds the pressure present at the inlet port 112, the poppet will seat against the upstream inner surface of the cavity, and flow from the outlet port to the inlet port will completely be prohibited.

Generally, this (permitting flow in one direction only, once the cracking pressure is exceeded) is how a check valve is supposed to function—namely, to permit fluid flow in one direction only, so as to isolate upstream components (not shown) from downstream components (not shown) in an overall fluid (piping) system (not shown), while permitting fluids to be introduced by the upstream components (e.g., gas bottles) to the downstream components (e.g., plasma chambers).

Unlike check valves of the prior art, the check valve 100 of the present invention may also be operated in a non-traditional "purge" mode. As best illustrated in FIG. 1C, when operating the system in the purge mode, the biasing component 150 is relocated to the downstream end of the valve body, thereby causing the poppet component 130 to be positioned away from the upstream end of the cavity, no longer being seated. This allows fluids to pass from the outlet port 118 to the inlet port 112, as indicated by the arrows in the drawing. Also, although not illustrated, with the check valve 100 in this "open" configuration, fluids can also flow unrestricted from the inlet port 112 to the outlet port 118. Hence, in the "purge" mode, the check valve operates bi-directionally.

It is within the scope of this invention that the purge mode can be initiated by removing the biasing component 150 from the upstream end of the check valve and disposing another similar biasing component, for example a biasing component having more or stronger magnets (154) on the downstream end of the check valve to retain the poppet component in its open (not seated) position.

It is also within the scope of the invention that one or more electromagnetic biasing components can permanently be installed at the upstream and downstream ends of the check valve, preferably exterior the valve body, in which case the "normal" mode would be initiated by switching on the upstream electromagnet, and the "purge" mode would be initiated by switching on the downstream electromagnet. This is described in greater detail hereinbelow.

Alternate Embodiments

FIGS. 2, 2A, 2B, 2C and 2D illustrate an alternate embodiment of a check valve 200 of the present invention. Many parts and components of this check valve 200 are similar to corresponding parts and components of the previously-described check valve 100.

Figure 2:
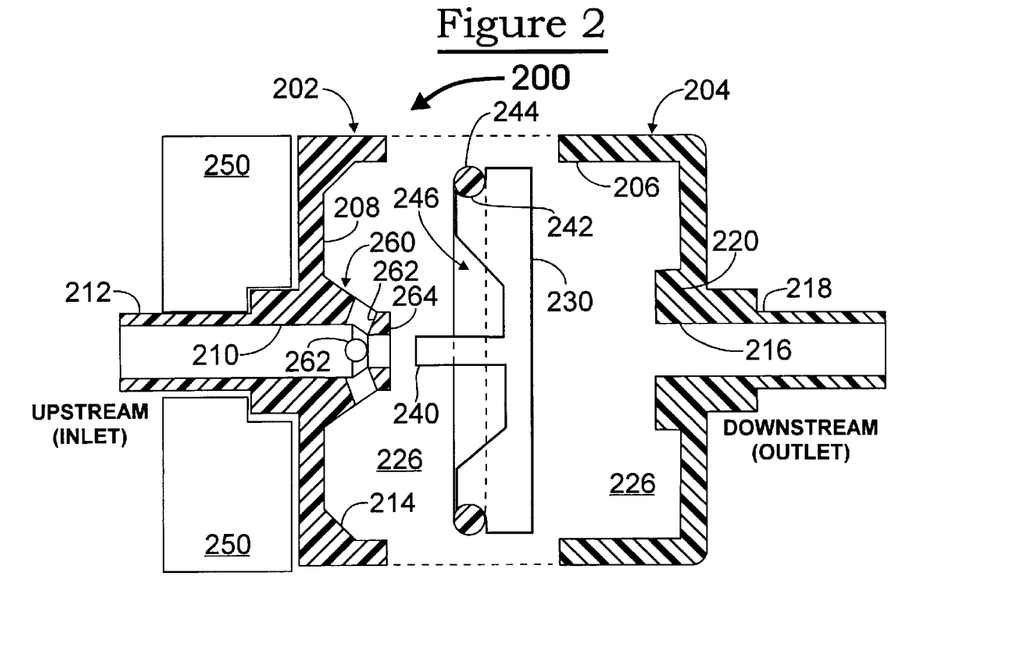
FIG. 2 is an exploded cross-sectional view of an alternate embodiment of the check valve of the present invention.

The valve body of the check valve 200 is formed of two parts, an upstream part 202 (compare 102) and a downstream part 204 (compare 104). These are similar in most respects (e.g., outside diameter) to the corresponding parts 102/104 of the valve 100. In this embodiment, the downstream body part 204 is similarly in the form of a disc, having an outer diameter, and is provided with a central hole (orifice) 216 (compare 116) having a diameter extending therethrough coaxially therewith. A cylindrical outlet port 218 (compare 118) is contiguous with an outer surface of the downstream body part 204 and is coaxial with the central hole 216.

In this embodiment, it is the downstream body part 204 rather than the upstream body part (compare 102) that is provided with a cylindrical portion 206 (compare 106) having an outer diameter and an inner diameter.

An inner surface of the downstream body part 204 is provided with a ring-like projection 220 much in the same manner as the ring-like projection 120 of the previous embodiment. In this embodiment 200, the ring-like projection is shown as having been formed integrally with the downstream body part 204.

The upstream body part 202 is similar to the upstream body part 102 of the previous embodiment 100 in that it has a disc-like portion 208 (compare 108), a beveled portion 214 (compare 114), an inlet orifice 210 (compare 110) and an inlet port 212 (compare 112). In this embodiment 200, the inner surface of the disc-like portion is provided with a central boss 260 extending axially into the cavity 226 (compare 126) from the inlet port 210. The inlet boss 260 is provided with a plurality, such as four, passageways 262 to permit fluid to flow between the inlet orifice 210 and the cavity 226, and is provided with an annular end 264 having an inside diameter.

Figure 2A:
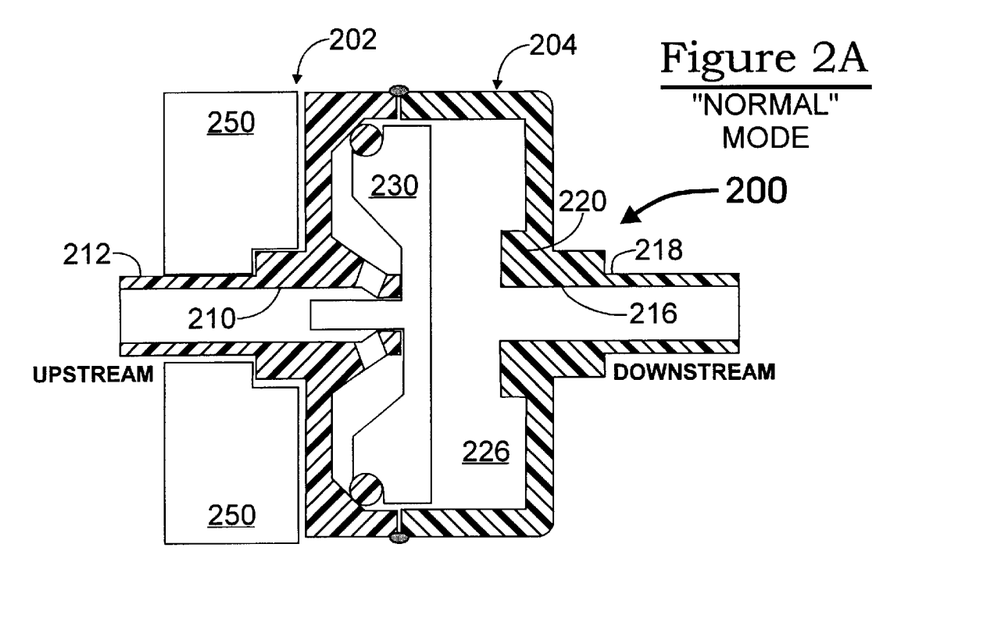
FIG. 2A is a cross-sectional view of the check valve of FIG. 2, fully assembled, in a "normal" mode of operation, showing the check valve closed (below cracking pressure), according to the invention.
Figure 2B:
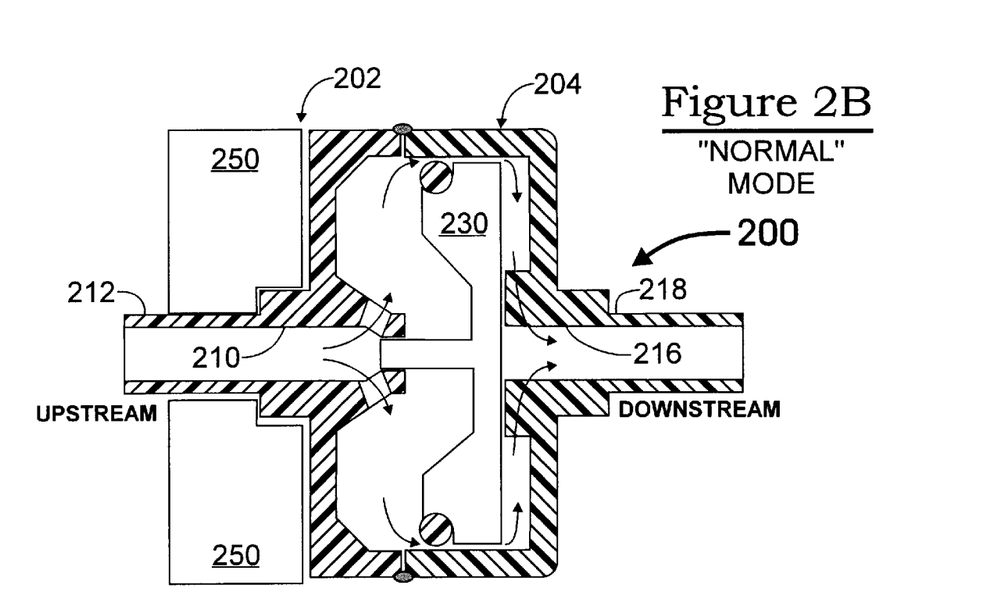
FIG. 2B is a cross-sectional view of the check valve of FIG. 2, fully assembled, in a "normal" mode of operation, showing the check valve open (cracking pressure exceeded), according to the invention.
Figure 2C:
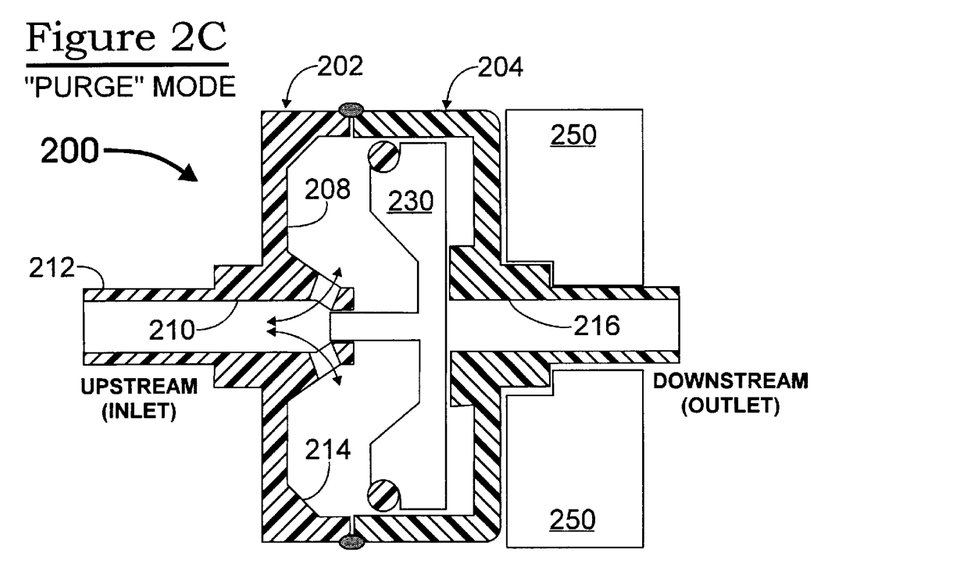
FIG. 2C is a cross-sectional view of the check valve of FIG. 2, fully assembled, in a "purge" mode of operation, according to the invention.
Figure 2D:
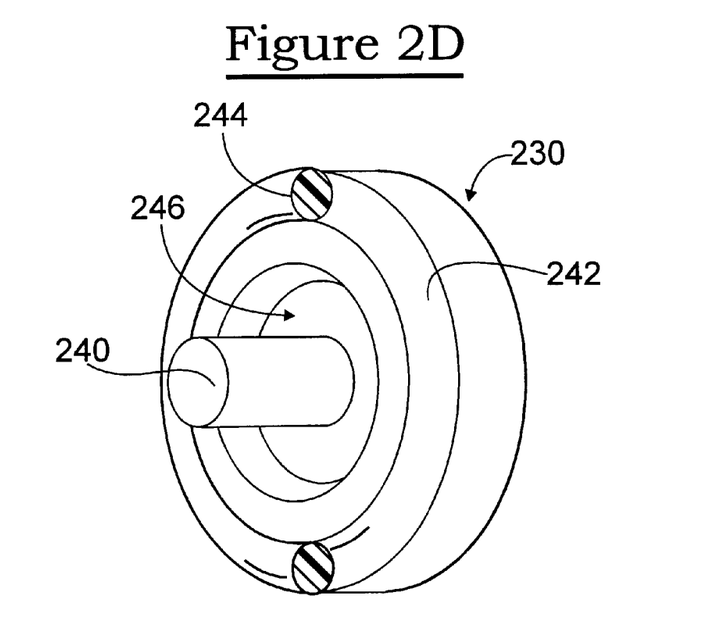
FIG. 2D is a perspective view of the poppet component of the check valve of FIG. 2, according to the invention.

As best viewed in FIG. 2D, the poppet component 230 is different than the poppet component 130 of the previous embodiment 100. Basically, the difference is that whereas the poppet 130 has a slotted upstream pin 140, the poppet 230 has a solid upstream pin 240. Thus, rather than the fluid flowing through the poppet pin 140, the upstream section 202 is designed to permit fluid flowing through the check valve to flow around the upstream pin 240. Another embodiment 400 described hereinbelow similarly employs a poppet 430 with a solid upstream poppet pin 440.

FIG. 2A (compare FIG. 1A) is a cross-sectional view of the check valve 200 of the present invention, in the "normal" mode of operation, with the magnet 250 disposed adjacent the downstream side of the check valve. In this view, the cracking pressure has not been exceeded, and the poppet 230 (i.e., the sealing ring 244) is seated against the inside surface 208 (214) of the cavity 226. When the cracking pressure is exceeded, the poppet 230 will move to a downstream position (to the right, as viewed din FIG. 2A), and fluid will flow through the check valve from the inlet port 212 to the outlet port 218, as shown in FIG. 2B (compare FIG. 1B).

FIG. 2C (compare FIG. 1C) is a cross-sectional view of the check valve 200 of the present invention, in the "purge" mode of operation, with the magnet 250 disposed adjacent the upstream side of the check valve. In this view, the poppet 230 is not seated against the surface 208 (214) of the cavity 226, but rather is moved upstream against the stops 220 and retained in this position by the attractive force of the magnet 250, thereby permitting bi-directional flow through the check valve.

Figure 3:
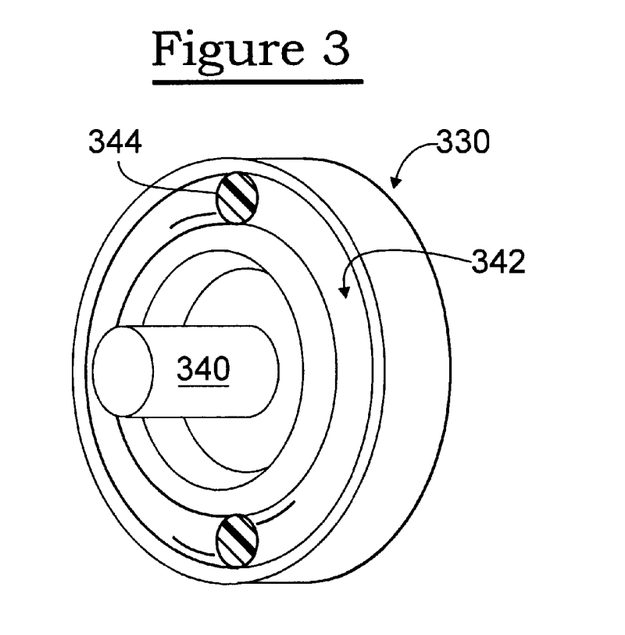
FIG. 3 is a perspective view of an alternate embodiment of a poppet component for the check valve of the present invention.

FIG. 3 illustrates an alternate embodiment of a poppet component 330 suitable to be employed in either of the check valves 100/200 described hereinabove.

Alternate Embodiment

Figure 4:
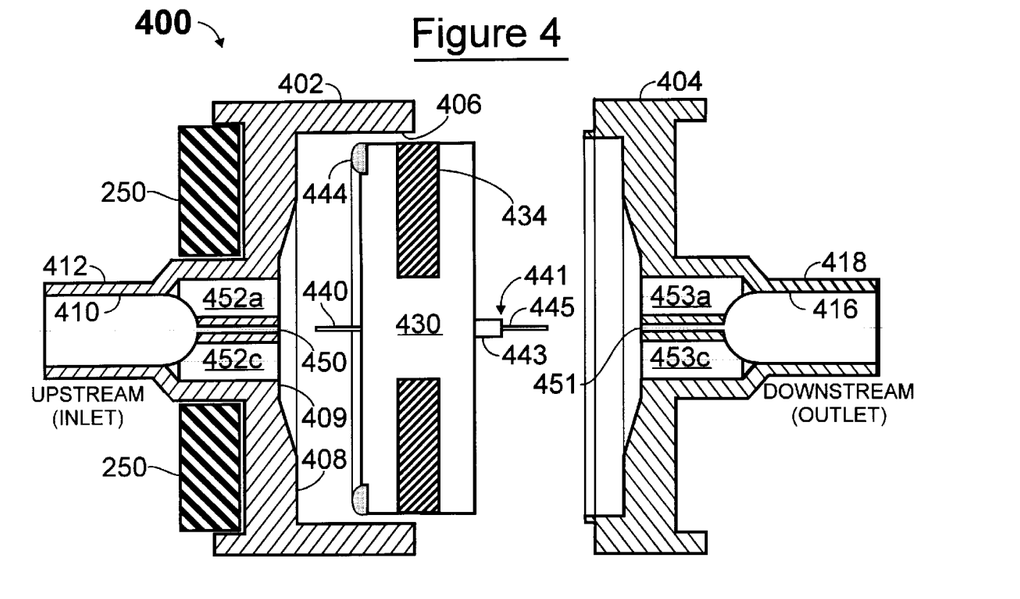
FIG. 4 is an exploded, cross-sectional view of a preferred embodiment of the invention.
Figure 4A:
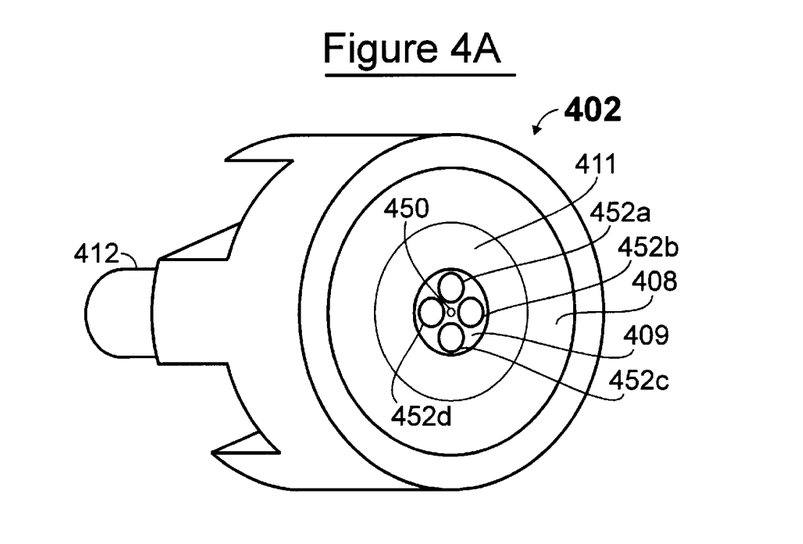
FIG. 4A is a perspective view of the upstream portion of the valve body of the embodiment shown in FIG. 4, according to the invention.

FIGS. 4 and 4A illustrate an alternate, preferred embodiment of a check valve 400 of the present invention. Many parts and components of this check valve 400 are similar to corresponding parts and components of the previously-described check valve 200.

The valve body of the check valve 400 is formed of two parts, an upstream part 402 (compare 202) and a downstream part 404 (compare 204). These are similar in most respects (e.g., outside diameter) to the corresponding parts 202 and 204 of the valve 200. A cylindrical outlet port 418 (compare 218) is contiguous with an outer surface of the downstream body part 404 and is coaxial with the central hole 416. A cylindrical inlet port 412 (compare 212) is contiguous with an outer surface of the upstream body part 402.

In this embodiment, the upstream body part 402, rather than the downstream body part 404 is shown as being provided with a cylindrical portion 406 (compare 206), although the situation could as well be reversed.

A generally cylindrical poppet 446 (compare 246) is disposed within the cavity formed by the upstream and downstream body parts 402 and 404, and is provided with a sealing ring 444 (compare 224) on its front (upstream) face. The sealing ring 444 is suitably a polymer, such as Viton (tm) bonded to the upstream face of the poppet 446 and, as in the previous examples, will form a seal against the inner surface of the upstream body part 402 when the pressure in the inlet port 412 is below a cracking pressure. A ferrous insert 434 (compare 134) is disposed within the body of the poppet 430, in the manner described hereinabove.

The poppet 430 of the present embodiment 400 differs somewhat in construction from those of the previous embodiments in the following manner. A solid pin 440 (compare 240) having a diameter extends axially from the center of the upstream face of the poppet 430. A similar solid pin 441 extends axially from the center of the downstream face of the poppet 430. The pin 441 is coaxial with the pin 440, and both are preferably coaxial with each of the inlet and outlet ports 412 and 418, respectively. Both pins 440 and 441 are suitably formed integrally with the main body portion of the poppet 430. As illustrated, the downstream pin 441 is stepped, having a proximal (to the body of the poppet) portion 443 with a greater diameter than a distal (to the body of the poppet) portion 445. The diameter of the distal portion 445 of the downstream pin 441 is suitably substantially the same as the diameter of the upstream pin 440. The enlarged portion 443 of the downstream pin 441 performs a similar function as the stops 220 in the embodiment 200—namely, preventing the poppet from sealing itself against the downstream portion 404, thereby allowing fluid to flow freely through the check valve when the cracking pressure has been exceeded.

The upstream portion 402 differs somewhat in construction from the upstream portions 102 and 202 described hereinabove. The inner surface of the upstream portion 402 has a first surface 408 and a second inner surface 409. The second inner surface 409 is recessed below (to the left, or upstream side as viewed) the first inner surface 408. A tapered surface 411 extends between the first inner surface 408 and the second inner surface 409.

A small central hole 450, having a diameter slightly larger than the diameter of the upstream pin 440, extends axially into the body portion 402 from the second inner surface 409, and is coaxial with the inlet port 412. A plurality (four shown) of holes 452a, 452b, 452c and 452d are disposed about the central hole 450 and also extend axially into the body portion 402 from the second inner surface 409. These four holes 452a . . . 452d extend fully to the bore 410 of the inlet port 412. The central hole 450 may also extend to the bore 410 of the inlet port 412. The pin 440 is preferably suitably long so as to always be at least partly disposed within the central guidehole 450. This helps guide the poppet 430 as it moves back and forth within the valve body.

The downstream body portion 404 is formed generally as a mirror image of the upstream body portion 402 in that it has a small central guide hole 451 (compare 450) surrounded by four larger holes, only two of which, 453a (compare 452a) and 453c (compare 452c) are visible in the view of FIG. 4. The distal portion 445 of the pin 441 is preferably suitably long so as to always be at least partly disposed within the central guidehole 451. This helps guide the poppet 430 as it moves back and forth within the valve body.

In this manner, when the poppet 430 is biased, by the magnet 250 against the inner surface of the upstream body portion 402, the sealing ring 444 forms an airtight seal with the first inner surface 408, thereby preventing fluid from flowing past the poppet 430 until a cracking pressure has been exceeded, as described hereinabove.

When the cracking pressure is exceeded, the poppet 430 moves to a downstream position, in the manner described hereinabove. The enlarged portion 443 of the pin 441 is sized so as to prevent the poppet from seating itself against the inner surface of the downstream portion 404, thereby allowing fluid to flow through the check valve in all cases when the cracking pressure is exceeded.

Electromagnet Biasing Means

Figure 5:
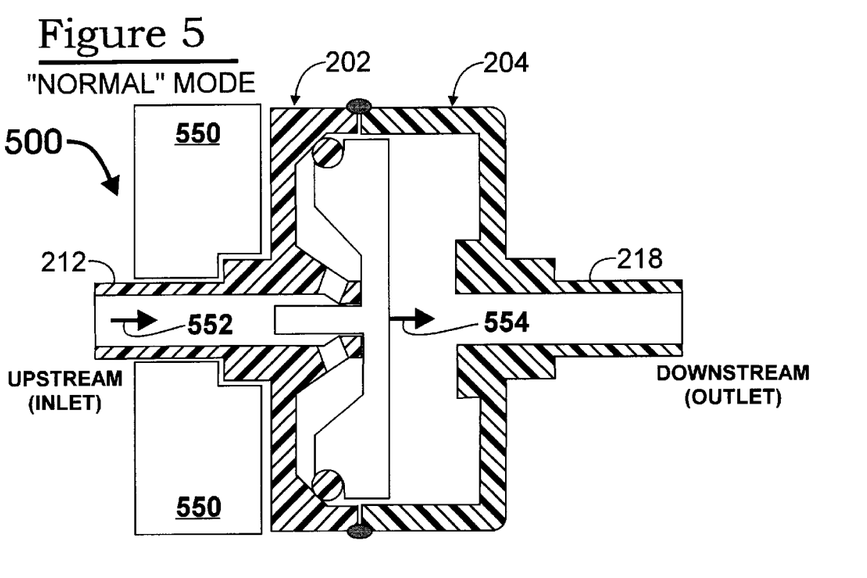
FIG. 5 is a side cross-sectional view of an embodiment of the check valve, fully assembled, in a "normal" mode of operation, showing the check valve closed (below cracking pressure), with an upstream electromagnetic biasing means, based on the illustrative embodiment of FIG. 2A, according to the invention.

FIG. 5 illustrates an embodiment 500 of the check valve of the present invention which, for illustrative purposes only, is similar in nearly all respects to the previously-described embodiment 200, except that the biasing means 550 is an electromagnet rather than an assembly of permanent magnets (compare, e.g., 150). In FIG. 5B, the check valve is shown in its "normal" mode with the poppet 230 biased against the inner surface of the upstream body portion 202. When fluid flow 552 in the inlet port 212 exceeds the cracking pressure, the poppet 230 will move downstream, allowing fluid to flow through the check valve and exit the outlet port 218.

Figure 5A:
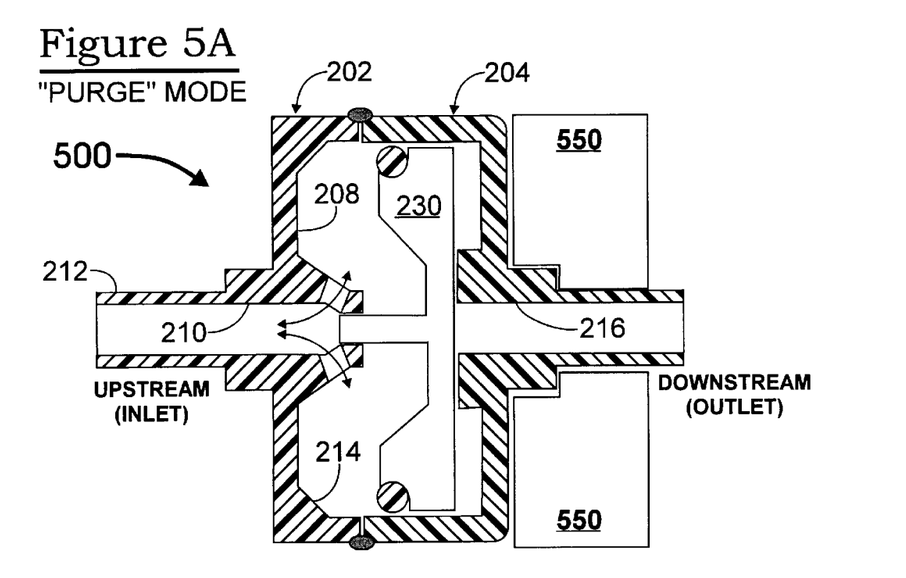
FIG. 5A is a side cross-sectional view of an embodiment of the check valve, fully assembled, in a "purge" mode of operation, showing the check valve closed (below cracking pressure), with a downstream electromagnetic biasing means, based on the illustrative embodiment of FIG. 2C, according to the invention.
Figure 5B:
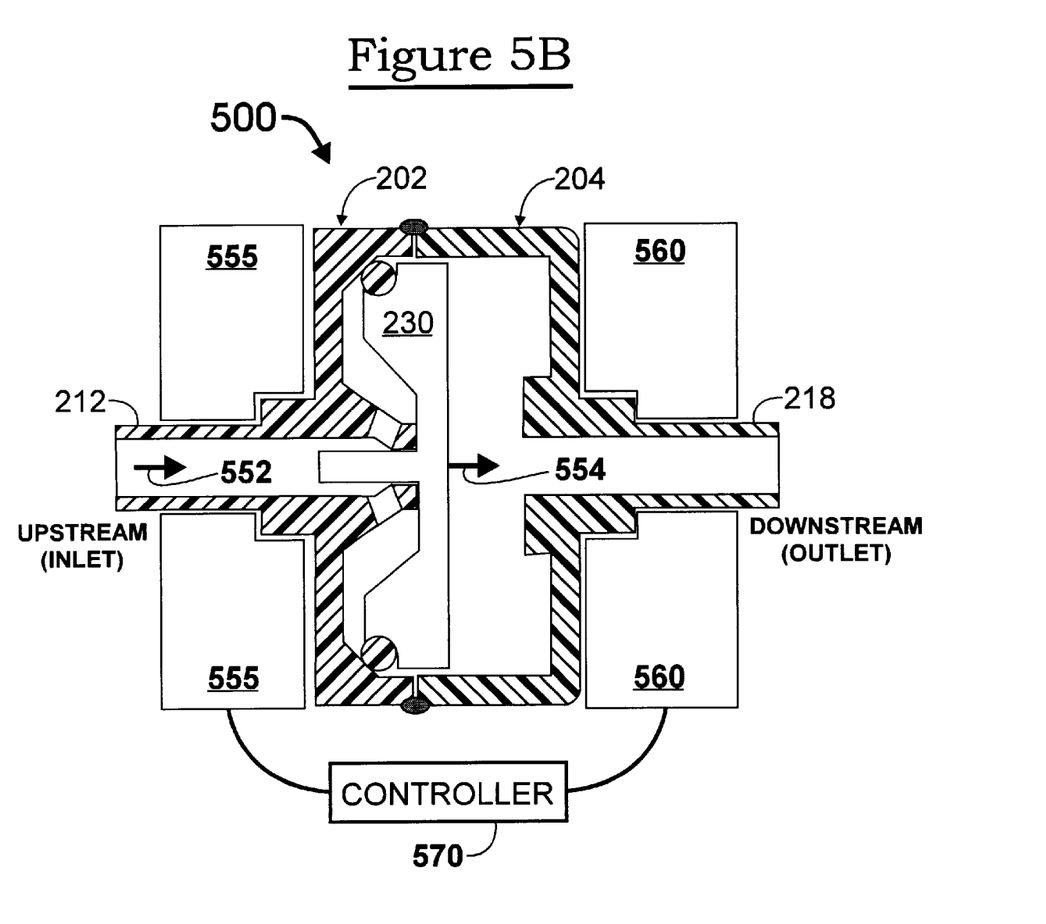
FIG. 5B is a side cross-sectional view of an embodiment of the check valve, fully assembled, showing the check valve closed (below cracking pressure), with both upstream and downstream electromagnetic biasing means, according to the invention.

As illustrated in FIG. 5A, in a purge mode, the electromagnet 550 can be relocated to the downstream side of the check valve to hold the poppet 230 in an open position, irrespective of the (positive) fluid pressure in the inlet port 212. However, it is considered a bit cumbersome to relocate the electromagnet 550 from the inlet side ("normal" mode) to the outlet side ("purge" mode).

To facilitate switching from normal to purge modes, it is preferred to provide an electromagnet 555 (compare 550) on the inlet side of the check valve, and another electromagnet 560 (compare 550) on the outlet side of the check valve. The two electromagnets 555 and 560 are connected, as illustrated in FIG. 5B to a controller 570 which is capable of selectively energizing selected ones of the two electromagnets 555 and 560. The controller 570 may be as straightforward as a single-pole double-throw (SPDT) toggle switch for selectively connecting either one of the two electromagnets 555 and 560 to a power supply (not shown). Or, the controller 570 can provide measured amounts of current to each of the electromagnets 555 and 560.

Additional Biasing Techniques

There have thus been described, hereinabove, a variety of constructions for magnetic check valves, each having a magnetic biasing means disposed external the valve and exerting a force on a partially ferrous poppet. It is within the scope of this invention that the poppet itself is magnetic, and the biasing means is ferrous.

Figure 6:
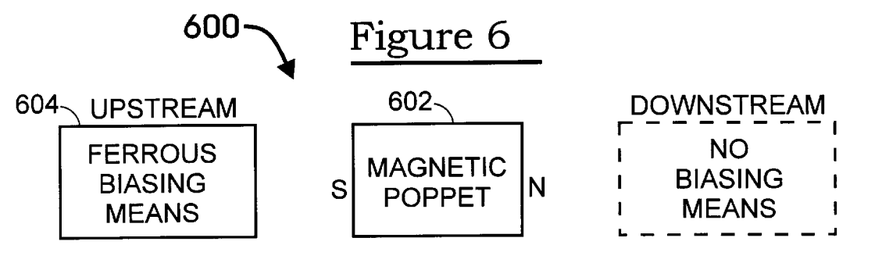
FIG. 6 is a schematic illustration of a check valve having a magnetic (rather than ferrous) poppet, and a ferrous (rather than magnetic) upstream biasing means, according to the invention.

FIG. 6 illustrates, schematically, an embodiment 600 of a magnetic check valve having a magnetic poppet 602. The magnetic poppet 602 has a one (e.g., south) pole oriented towards the upstream side of the check valve and an opposite (e.g., north) pole oriented towards the downstream side of the check valve. A ferrous member 604 disposed on the upstream side of the check valve will exert a biasing force on the poppet 602, urging the poppet (i.e., its sealing member, not shown) against the inner surface of the upstream member (e.g., 402). This embodiment 600 is essentially a substitution of ferrous for magnetic biasing means, and magnetic for ferrous poppet, as contrasted with the embodiments (100, 200, 400) described hereinabove.

Figure 6A:
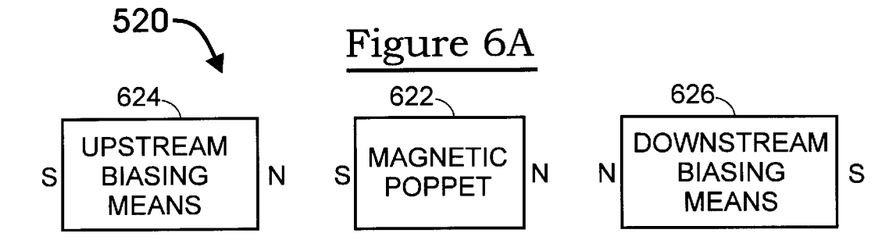
FIG. 6A is a schematic illustration of a check valve having magnetic upstream and downstream biasing means, and a magnetic poppet, according to the invention.

FIG. 6A illustrates, schematically, an embodiment 520 of a magnetic check valve having a magnetic poppet 622. The magnetic poppet 622 has a one (e.g., south) pole oriented towards the upstream side of the check valve and an opposite (e.g., north) pole oriented towards the downstream side of the check valve. An upstream biasing means 624 (compare 555) is a magnet (including electromagnet) having a one (north) pole oriented towards the poppet 622 so as to exert an attractive force on the poppet 622. A downstream biasing means 626 (compare 560) is a magnet (including electromagnet) having a one (north) pole oriented towards the poppet 622 so as to exert a repulsive force on the poppet 622. In this manner, the downstream biasing means 626 can be used to augment or adjust the biasing force of the upstream biasing means 624, hence the cracking pressure required to dislodge the poppet 622 and allow fluid to flow through the check valve.

Figure 6B:
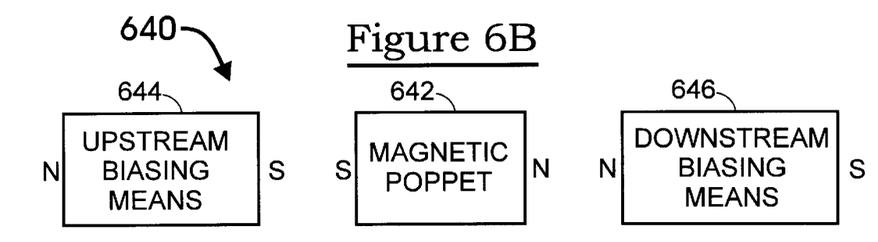
FIG. 6B is a schematic illustration of a check valve having magnetic upstream and downstream biasing means, and a magnetic poppet, according to the invention.

FIG. 6B illustrates, schematically, yet another embodiment 640 of a magnetic check valve having a magnetic poppet 642. The magnetic poppet 642 has a one (e.g., south) pole oriented towards the upstream side of the check valve and an opposite (e.g., north) pole oriented towards the downstream side of the check valve. An upstream biasing means 644 (compare 624) is a magnet (including electromagnet) having a one (south) pole oriented towards the poppet 622 so as to exert a repulsive force on the poppet 642. A downstream biasing means 646 (compare 626) is a magnet (including electromagnet) having a one (north) pole oriented towards the poppet 642 so as also to exert a repulsive force on the poppet 642. In this manner, the upstream and downstream biasing means 644 and 646 both exert repulsive forces on the poppet 642. With these forces unbalanced, for example, the repulsive force of the downstream biasing means 626 exceeding the repulsive force of the upstream biasing means 644, the poppet 622 will stay closed until the cracking pressure is attained, then will open gradually.

Figure 6C:
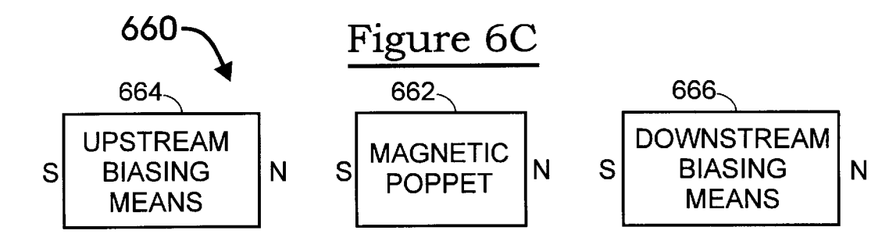
FIG. 6C is a schematic illustration of a check valve having magnetic upstream and downstream biasing means, and a magnetic poppet, according to the invention.

FIG. 6C illustrates, schematically, yet another embodiment 660 of a magnetic check valve having a magnetic poppet 662. The magnetic poppet 662 has a one (e.g., south) pole oriented towards the upstream side of the check valve and an opposite (e.g., north) pole oriented towards the downstream side of the check valve. An upstream biasing means 664 (compare 644) is a magnet (including electromagnet) having a one (north) pole oriented towards the poppet 642 so as to exert an attractive force on the poppet 662. A downstream biasing means 666 (compare 646) is a magnet (including electromagnet) having a one (north) pole oriented towards the poppet 662 so as also to exert a repulsive force on the poppet 642. In this manner, the downstream biasing means 666 diminishes the force exerted by the upstream biasing means 664. With these forces unbalanced, for example, the attractive force of the upstream biasing means 664 exceeding (e.g., by a factor of two) the attractive force of the downstream biasing means 666, the poppet 662 will stay closed until the cracking pressure is attained, then will open abruptly and positively (e.g., with a "snap").

It is within the scope of this invention that in any embodiment having two magnetic biasing means, an upstream biasing means (e.g., 664) and a downstream biasing means (e.g., 666), that one of the biasing means is a permanent magnet and the other of the two biasing means is an electromagnet.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Method of controlling the flow of fluids in a fluid flow line, comprising:

providing a valve in the fluid flow line, said valve having a valve body with a cavity, an inlet port on an upstream side of the valve body, an outlet port on a downstream side of the valve body, and a moveable poppet element disposed within the cavity of the valve body;

in a normal mode of operation, removably placing a first magnet external of the valve body on the upstream side thereof, thereby causing the poppet element to be biased against an upstream end of the cavity to permit fluid to flow from the inlet port to the outlet port only when fluid on the inlet port exceeds a biasing pressure and to prohibit fluid from flowing from the outlet port to the inlet port when the poppet element is biased against the upstream end and the inlet pressure is less than the biasing pressure; and in a purge mode of operation, removably-placing a second magnet external of the valve body on the downstream side thereof, thereby causing the poppet element to be biased away from the upstream end of the cavity to permit fluid to flow freely from the outlet port to the inlet port when the outlet pressure is less than the biasing pressure, and from the inlet port to the outlet port to purge the fluid flow line.

2. Method, according to claim 1, wherein:

the first magnet and the second magnet are the same magnet.

3. A fluid flow control valve comprising:

a valve body comprising a cavity, an inlet port on an upstream side of the valve body, an outlet port on a downstream side of the valve body, and a moveable poppet disposed within the cavity of the valve body;

a magnet removably positioned external of the valve body on the upstream side thereof, thereby causing the poppet to be biased against an upstream end of the cavity to permit fluid to flow from the inlet port to the outlet port only when fluid on the inlet port exceeds a biasing pressure and to prohibit fluid from flowing from the outlet port to the inlet port when the poppet is biased against the upstream end and the inlet pressure is less than the biasing pressure; and a magnet removably positioned external of the valve body on the downstream side thereof, thereby causing the poppet to be biased away from the upstream end of the cavity to permit fluid to flow freely from the outlet port to the inlet port when the outlet pressure is less than the biasing pressure, and from the inlet port to the outlet port to purge the fluid flow line.

4. A valve, according to claim 3, wherein:

a portion of the poppet is formed of a ferrous material;

a portion of the poppet is formed of a non-ferrous material; and the non-ferrous material is stainless steel.

5. A valve, according to claim 3, wherein:

a portion of the poppet is formed of a ferrous material;

a portion of the poppet is formed of a non-ferrous material; and the non-ferrous material is plastic.

6. A valve, according to claim 3, wherein:

a portion of the poppet is formed of a ferrous material;

a portion of the poppet is formed of a non-ferrous material; and the ferrous portion of the poppet is an interior portion of the poppet.

7. A valve, according to claim 3, wherein:

a portion of the poppet is formed of a ferrous material;

a portion of the poppet is formed of a non-ferrous material; and the ferrous portion of the poppet contains elemental iron.

8. A valve, according to claim 3, wherein:

the biasing element is a permanent magnet.

9. A valve, according to claim 3, wherein:

the biasing element is an electromagnet.

10. A valve, according to claim 3, wherein:

the biasing element is a disc of non-ferrous material with a plurality of magnet elements disposed thereon.

11. A valve, according to claim 3, wherein:

the biasing element is removably affixed to the exterior of the valve body on the inlet end thereof.

12. A valve, according to claim 3, wherein:

the poppet comprises a non-ferrous material and a ferrous material.

13. A valve, according to claim 3, wherein:

a single magnet is sized and shaped to be selectively disposed on either an inlet port or an outlet port of the valve body.

14. A valve, according to claim 3, wherein:

the poppet comprises a magnet.

* * * * *